United States Patent [19]

Sloat

[11] Patent Number: 4,844,169

[45] Date of Patent: Jul. 4, 1989

[54] NITROGEN STIMULATION OF A POTASSIUM HYDROXIDE WELLBORE TREATMENT

[75] Inventor: Benjamin F. Sloat, Lakewood, Colo.

[73] Assignee: Marathon Oil Company, Findlay, Ohio

[21] Appl. No.: 286,586

[22] Filed: Dec. 19, 1988

Related U.S. Application Data

[63] Continuation of Ser. No. 85,440, Aug. 14, 1987, abandoned.

[51] Int. Cl.$^4$ .................. E21B 43/22; E21B 43/25
[52] U.S. Cl. ......................... 166/292; 166/273; 166/305.1
[58] Field of Search ............ 166/292, 273, 274, 305.1, 166/311, 370; 405/263; 106/900; 252/8.551

[56] References Cited

PUBLICATIONS

Tver, David F. et al., *The Petroleum Dictionary*, by Van Nostrand Reinhold Company, Inc., 1980, p. 301.

*Primary Examiner*—George A. Suchfield
*Attorney, Agent, or Firm*—Jack L. Hummel

[57] ABSTRACT

Clays in water sensitive subterranean formations are stabilized by injecting a sufficient amount of an unreactive gas, preferably nitrogen, into the formation to substantially fluidize the clays, including migratable fine particles, enabling their removal from the formation. Thereafer, an aqueous solution of soft water containing potassium chloride is injected into the formation to effect a cationic exchange between the potassium and the sodium within the swellable clays to reduce their swelling. An aqueous solution of soft water and potassium hydroxide is then injected into the formation. The potassium hydroxide renders the clays relatively insensitive to the presence of an aqueous liquid having an ionic makeup distinct from connate waters within the formation. Thus, the process protects against formation damage by the presence in the formation of a "fresher" water than the connate. The well treated according to this process can be an injection well or a production well.

14 Claims, No Drawings

NITROGEN STIMULATION OF A POTASSIUM HYDROXIDE WELLBORE TREATMENT

DESCRIPTION

This application is a continuation patent application of copending U.S. patent application Ser. No. 07/085,440 filed on Aug. 14, 1987, now abandoned, and assigned to Marathon Oil Company and Tiorco, Inc.

BACKGROUND OF THE INVENTION

1. Technical Field

Nitrogen is used to improve the process of stabilizing clays with an aqueous potassium hydroxide solution.

2. Background Information

Sandstone formations containing fine particles can be damaged when the fine particles come in contact with an aqueous solution containing an ionic makeup different from that of the connate waters. Such can cause permeability reduction and reduce the flow of fluids through both injection wells and production wells. It is especially prevalent in such formations where brines become progressively fresher. The "fine" particles are not limited to clays but include all swelling and potentially mobile fine particles within the sandstone pore bodies. Examples of such fine particles include clay minerals, large surface area silica ($SiO_2$) minerals, feldspars, mica, and barite.

Encroachment of the "fresher" brines in the sandstone formation can occur in a variety of different ways. For example, invasion by an underlying aquifer, invasion of an enhanced oil recovery process, invasion of fluids used to treat near wellbore phenomenon, and like instances. Two distinct types of clay damage can result from such encroachment. First, swellable clays, such as montmorillonite having interstitial layers, swell when contacted with the fresher brines reducing the permeability to fluid flow therethrough. Secondly, migratable clays, such as poorly cemented kaolinite and illite clay particles, become detached from the sandstone formation during the flow of fresh water therethrough and the clay particles become trapped in the formation pore-throat openings reducing permeability and fluid flow therethrough. Often, encroachment of fresher brines into a sandstone formation containing clays results in the occurrence of both types of permeability damage.

To overcome this problem, U.S. Pat. No. 3,640,343 teaches injecting an aqueous solution of alkali metal silicate containing $SiO_2$ to stabilize such formations, especially during drilling or fluid production. U.S. Pat. No. 4,536,304 teaches stabilizing fine particles in a formation by contacting the particles with nitrogen-containing cationic perfluorinated compounds. This treatment can be done in conjunction with an acidizing process. Also the art teaches the use of organic polycationic polymers to prevent or reduce the adverse effects of swelling clays or migrating fines or combinations thereof in subterranean formations. See U.S. Pat. Nos. 4,366,071; 4,366,072; 4,366,073; 4,366,074; 4,374,739; 4,460,483 and 4,462,718.

U.S. Pat. No. 4,534,413 teaches stimulating water flow in a well by injecting liquid or gaseous nitrogen and/or liquid or gaseous carbon dioxide into the well and alternately pressurizing and depressurizing the well to cause the formation between the well wall and the water supply to be exposed to high pressures and fractures to thereby stimulate the flow of water into the well.

U.S. Pat. No. 4,280,560 teaches the use of potassium hydroxide to stabilize sandstone formations containing water-sensitive fine particles. The potassium hydroxide interacts with the fine particles to substantially prevent formation permeability damage caused by encroachment of water having an ionic makeup different from the connate water. The potassium hydroxide renders the fine particles immobile.

SUMMARY OF THE INVENTION

Injection or production wells, damaged by migratable fine particles are treated by first injecting nitrogen into the formation under pressure and causing the nitrogen to surge back and forth into the wellbore to remove loose fine particles. This can be repeated more than once depending upon the nature of the formation being treated and the extent of damage. Thereafter, the well is bailed to remove all foreign particles. Potassium chloride, solubilized in soft water, is then injected into the wellbore and permitted to soak long enough to effect a cationic exchange between the potassium and the sodium within the reservoir rock. Thereafter, potassium hydroxide is injected and displaced out into the reservoir that is adversely affected by the fine particles and is permitted to soak long enough to alter the silicate chemistry of the clays and render them insensitive to fresh water.

PREFERRED EMBODIMENTS OF THE INVENTION

Production and injection wells that are damaged by sensitive clays, more particularly, migratable fine particles, are treated by this invention. Such wells contain migratable fine particles that become detached from the sandstone formation during the flow of fresh water therethrough causing the particles to become trapped in pore-throat openings of the formation and result in permeability damage. Such particles include clay minerals, large surface area silica ($SiO_2$) minerals, feldspars, mica and barite as well as clays which are sensitive to swelling due to a change in ionic properties of the interstitial or connate waters.

The well is treated by first injecting into the formation nitrogen or a like inert gas. The gas is injected at a pressure sufficient to cause it to flow back into the formation away from the wellbore. Thereafter, the pressure is rapidly reduced causing the gas to implode back into the wellbore—the gas carries with it migratable fine particles. The operation can be repeated more than once and depends upon the extent of damage. Also, the duration of the time lapse between pressurizing the gas and rapidly releasing the pressure depends upon the extent, radially from the wellbore, the reservoir is to be treated. Thereafter, the well is bailed, swabbed or reverse circulated to remove the particles carried out by the surging gas.

The well is then treated with a soft water solution of potassium chloride (KCl), the soft water and the resulting solution of KCl is preferably silica free. The KCl is permitted to contact the sandstone formation long enough to effect a cationic exchange between the potassium and the sodium in the clays. Contact times of about 4 to about 64 hours and preferably about 8 to about 32 hours are sufficient to permit the cationic exchange. Preferably about 100 to about 10,000 and more preferably about 500 to about 5000 pounds/porosity foot of KCl is injected. "Pounds/porosity foot" is defined as the dry or 100% active weight of the product, i.e., KCl, divided by the total porosity feet. A porosity foot is defined as the linear depth of the wellbore multiplied by the percent porosity or average percent porosity of the reservoir rock. Thus, one porosity foot can be equal to 10 vertical feet of rock multiplied by 10% porosity. The KCl is dissolved in a water void of divalent cations and preferably containing less than about 1000 ppm and more preferably less than about 100 ppm of monovalent cation containing salts. Such water is herein defined as "soft" water. Also, sufficient quantities of the aqueous KCl solution should be injected to displace or dilute any divalent cations away from the formation to be treated; for a typical well this can be about 100 to about 10,000 and preferably about 500 to about 5000 pounds/porosity foot of dry weight KCl. Concentration of the KCl in the aqueous solution can be about 2 wt %, to the saturation point and preferably is about 3 to about 5 wt %, but in all cases should exceed the salt concentration of the connate water.

Thereafter, an aqueous solution containing potassium hydroxide (KOH) is injected into the well. About 100 to about 100,000 and more preferably about 500 to about 50,000 and most preferably about 10,000 pounds/porosity foot of potassium hydroxide is injected into the formation. The potassium hydroxide is dissolved in an aqueous solution preferably containing no divalent cations and more preferably containing less than about 1000 ppm of monovalent cations containing salts. In addition, it is preferred that the aqueous solution contains no silica. Concentrations ranging from about 1 wt % to about 50 wt % or the saturation point of the potassium hydroxide in the water are useful. Preferably, the concentration is within the range of 2 to about 45 wt % and most preferably about 15 to about 30 wt %.

The potassium hydroxide is preferably injected radially out into the reservoir rock to a distance of at least about 25 feet and more preferably about 50 feet; however, this radial distance will depend upon the extent of the formation damage.

It is important that once the injection of the aqueous potassium hydroxide solution is started into the formation that it be continuous. Preferably the rate of injection is about 2 to about 20 barrels per hour and more preferably about 5 to about 10 barrels per hour for an average well. However, the rate depends upon the thickness of the formation to be treated. For example, if the formation to be treated is 50 feet thick, then about 10 to about 100 barrels per hour can be injected. However, if the thickness is about 10 feet, then the rate can be about 2 to about 10 barrels per hour. As mentioned earlier, once injection of potassium hydroxide is started, it preferably is not stopped. If injection is stopped, there is a possibility that connate water could backflow or diffuse into the formation being treated and mix with the potassium hydroxide solution causing undesirable precipitates to form between divalent cations and the potassium hydroxide.

A displacing fluid is injected after the potassium hydroxide to displace the potassium hydroxide out into the formation to be treated. The displacing fluid can be an aqueous solution of KCl or weak inorganic acid, e.g. 7.5 wt % HCl solution, and is preferably water containing no divalent cations and more preferably less than about 1000 ppm of monovalent cation containing salts. Nitrogen or carbon dioxide or a like inert gas can also be used as a displacing fluid and are preferred where producing wells are being pretreated to prevent clay damage.

It is preferred that the potassium hydroxide be displaced out of the wellbore and into the formation such that all of the clay sensitive areas of the formation are contacted with the potassium hydroxide. Thereafter, the well is shut in and the fine particles are permitted to remain in contact with the potassium hydroxide for approximately 4 to about 64 hours and more preferably about 8 to about 32 hours and most preferably about 16 hours. Sufficient time should be given to permit the potassium hydroxide to "permanently" alter the silicate chemistry of the clays and thus render them insensitive to fresh water. After treatment, the clays are insensitive to fresh water for an extended period of time.

Thereafter, the well is returned to its normal operation, e.g. in the case of a production well it is permitted to produce or, if the well is an injection well, water is again injected into the well. Increased relative permeability to flow of either oil or water is realized as the fluids move through the formation.

EXAMPLE 1

A damaged injection well, having a formation thickness of about 20 feet and a porosity of about 23% is treated by injecting 5000 standard cubic feet (SCF) of nitrogen into the formation at a pressure sufficient to cause the nitrogen to flow out into the formation to a distance of about 25 feet radially from the wellbore. Thereafter, the pressure on the well is released and the gas surges back into the wellbore carrying with it migratable fine particles. Thereafter, the well is bailed to remove particles from the wellbore. The well is then treated by injecting 12,500 lbs of KCl dissolved in an aqueous solution containing about 1000 ppm of monovalent cation containing salts. The concentration of the KCl in the water is about 3.5 wt %. Potassium chloride is injected at a rate of about 40 barrels per hour (BPH). The well is shut in for 20 hours, permitting the potassium cation to exchange with the sodium cation within the fine particles contacted by the KCl solution. Thereafter, about 340 barrels (BBLS) of an aqueous potassium hydroxide solution are continuously injected into the formation over about 48 hours. The concentration of the potassium hydroxide in the water is about 30 wt %. Thereafter, about 1000 BBLS of soft water is injected into the well to displace the potassium hydroxide out into the formation. The well is then shut in for about 20 hrs. It is then returned to service. It has an improved relative permeability to the flow of water and higher injection rates of water are realized as compared to the condition of the well prior to the treatment.

EXAMPLE 2

A damaged production well, having a formation thickness of about 60 feet and a porosity of about 17% is treated by injecting 10,000 SCF of nitrogen into the formation at a pressure of about 2,000 psi. Thereafter, the pressure on the well is released and the gas is permitted to surge back into the wellbore. The well is swabbed to remove particles from the wellbore. The well is then treated by injecting 30,000 lbs of KCl dissolved in an aqueous solution containing about 80 ppm of monovalent cation containing salts, this is substantially less than the salt concentration in the connate water. The concentration of the KCl in the water is about 5 wt %. KCl is injected at a rate of about 100 BPH. The well is shut in for 24 hrs., permitting the potassium cation to exchange with the sodium cation within the fine particles contacted by the KCl solution. Thereafter, about 600 BBLS of an aqueous potassium hydroxide solution are continuously injected into the formation over about 48 hrs. The concentration of the potassium hydroxide in the water is about 15 wt %. Thereafter, about 10,000 SCF of $CO_2$ is injected into the well to displace the potassium hydroxide out into the formation. The well is then shut in for about 72 hrs. It is then returned to service. It has an improved relative permeability to the flow of oil and water. Total fluid production from the well increases from less than 25 BPD before treatment to more than 200 BPD after treatment. One month later the well is averaging 185 BPD of fluid.

EXAMPLE 3

A well producing from a clay sensitive reservoir under waterflood shows a sharp drop in productivity from 260 to less than 50 BOPD after water breaks through. The formation thickness at this recovery point is 16 feet and porosity is 14%. The well is treated with 4000 SCF of nitrogen at a surface pressure of 3200 PSIG to fluidize clay particles in the near wellbore area and transport them out into the formation at least 25 feet from the wellbore and ideally farther than 50 ft. A 300 BBL slug containing 6000 LBS of 100% active KCl dissolved in softened and filtered water containing less than 1000 ppm of monovalent cations is pumped into the well at a rate of 25 BPH. Immediately thereafter 300 BBLS of 15 wt % potassium hydroxide made up in softened and filtered water, free of divalent cations such as calcium, magnesium and silica and containing less than 1000 ppm of monovalent cations, is pumped into the formation at a rate of 6 BPH. The KOH treatment is then displaced from the near wellbore area with 150 BBLS of lease crude oil and the well shut in for 36 hrs. The well is put back on production at the same rate as before treatment and the oil overflush recovered due to the expansion and displacement effect of the previously injected nitrogen. After the moveable aqueous solutions of KCL and KOH are recovered, the producing rate is allowed to increase in weekly increments of 50 BPD. A sustained production level of 150 BFPD is achieved for a threefold improvement over the damaged condition prior to treatment.

EXAMPLE 4

A producing well in a clay sensitive reservoir that is going to be waterflooded is pretreated to prevent damage that will occur as water breaks through.

The well, having a formation thickness of 18 ft. and a porosity of 14%, is treated by injecting 5000 SCF of nitrogen into the formation at a pressure sufficient to cause the nitrogen to flow out into the formation to a distance of 50 feet radially from the wellbore.

The well is then treated with 10,000 LBS of KCl dissolved in a filtered soft water solution containing less than 1000 ppm of monovalent cation containing salts. The concentration of the KCl is 2.5% by weight and the solution is allowed to flow on gravity head into the well at 10 BPH. The well is shut in for 16 hours permitting the potassium cation to exchange with the sodium cation of clays in the contacted reservoir area. Thereafter, 200 barrels of an aqueous solution containing soft water and 15 wt % potassium hydroxide is continuously injected into the formation over a 48 hour period. About 500 BBLS of soft water is then pumped into the well to displace the KOH solution from the near wellbore area.

After a second 16 hour shut-in period, the well is swabbed back.

The well is produced for an extended period of time at a rate similar to the rate of production before treatment, during this period the peak dry oil response is 220 BPD. Water breaks through due to the waterflood and there is an increase in water production. The oil producing rate remains stable. When compared with nearby producers that were not pretreated with potassium hydroxide, the oil producing rate is substantially higher than the nearby producers. Moreover, a significantly greater amount of oil is recovered from the treated well after water breakthrough. As compared to the other producing wells, the water-oil-ratio at any given volume of oil recovery after breakthrough is lower than the water-oil-ratios for nearby untreated or control wells.

I claim:

1. A process for stabilizing permeable consolidated rock in a near wellbore area of a hydrocarbon-bearing subterranean sandstone formation penetrated by a wellbore of a well in fluid communication therewith, the formation having pores containing swellable and migratable fine particles which are sensitive to permeability reducing formation damage when contacted with an aqueous liquid having an ionic makeup distinct from connate water in the formation, the process comprising sequentially the steps of:

(a) injecting an effective amount of a substantially unreactive gas via the wellbore out through the pores of the consolidated rock in the near wellbore area away from the wellbore at an injection pressure sufficient to entrain the migratable fine particles present in the pores of the consolidated rock in the near wellbore area of the formation;

(b) reducing the injection pressure of the gas to cause the gas having the migratable fine particles entrained therein to flow back through the pores of the consolidated rock in the near wellbore area of the formation into the wellbore;

(c) depositing the migratable fine particles in the wellbore;

(d) removing the migratable fine particles from the wellbore;

(e) injecting a first aqueous solution, comprising soft water having about 100 to about 10,000 pound/porosity foot of potassium chloride, via the wellbore out through the pores of the consolidated rock in the near wellbore area of the formation an average radial distance up to about 25 feet from the wellbore;

(f) shutting in the well for time sufficient to permit a cationic exchange between potassium ions in the first aqueous solution and sodium ions in the swellable fine particles in the pores of the consolidated rock in the near wellbore area of the formation, wherein said cationic exchange reduces any existing swelling of the swellable fine particles caused by contact with an aqueous liquid having an ionic makeup distinct from the connate water;

(g) continuously injecting a slug of a second aqueous solution, comprising soft water having about 100 to about 100,000 pounds/porosity foot of potassium hydroxide, via the wellbore out through the pores of the consolidated rock in the near wellbore area at a rate sufficient to prevent the connate water from backflowing through the near wellbore area of the formation;

(h) displacing the second aqueous solution with a displacing fluid out beyond the near wellbore area an average radial distance greater than at least about 25 feet from the wellbore to contact the swellable fine particles in the pores of the consolidated rock in the near wellbore area and in the pores of the formation beyond the near wellbore area and to contact the migratable fine particles in the pores of the formation beyond the near wellbore area;

(i) shutting in the well for a time sufficient to render the swellable fine particles in the pores of the formation in and beyond the rear wellbore area and the migratable fine particles in the pores of the formation beyond the near wellbore area insensitive to subsequent formation damage caused by contact with the aqueous liquid having an ionic makeup distinct from the connate water; and (j) returning the well to normal operation.

2. The process of claim 1 wherein the well is shut in for about 4 to about 64 hrs in step (i).

3. The process of claim 1 wherein the well is shut in for about 4 to about 64 hrs in step (f).

4. The process of claim 1 wherein the first aqueous solution of potassium chloride contains substantially no silica.

5. The process of claim 1 wherein the first aqueous solution contains substantially no divalent cations and less than about 1000 ppm of monovalent cation-containing salts other than potassium chloride.

6. The process of claim 1 wherein the potassium chloride concentration in the first aqueous solution is from about 2 wt % to about the saturation point of the potassium chloride in the soft water.

7. The process of claim 1 wherein about 500 to about 5000 pounds/porosity foot of potassium chloride is injected into the formation in step (e).

8. The process of claim 1 wherein the displacing fluid is soft water, crude oil, carbon dioxide, nitrogen, or a weak inorganic acid.

9. The process of claim 8 wherein the wellbore is a production well and the displacing fluid is crude oil.

10. The process of claim 1 wherein the potassium hydroxide concentration of the second aqueous solution is between about 15 wt % and about 30 wt %.

11. The process of claim 1 wherein the substantially unreactive gas is nitrogen.

12. A process for stabilizing permeable consolidated rock in a near wellbore area of a hydrocarbon-bearing subterranean sandstone formation penetrated by a wellbore of a well in fluid communication therewith, the formation having pores containing swellable and migratable fine particles which are sensitive to permeability reducing formation damage when contacted with an aqueous liquid having an ionic makeup distinct from connate water in the formation, the process comprising sequentially the steps of:

(a) injecting an effective amount of a substantially unreactive gas via the wellbore out through the pores of the consolidated rock in the near wellbore area away from the wellbore at an injection pressure sufficient to entrain the migratable fine particles present in the pores of the consolidated rock in the near wellbore area of the formation;

(b) injecting a first aqueous solution, comprising soft water having about 100 to about 10,000 pound/porosity foot of potassium chloride, via the wellbore out through the pores of the consolidated rock in the near wellbore area of the formation an average radial distance up to about 25 feet from the wellbore;

(c) shutting in the well for time sufficient to permit a cationic exchange between potassium ions in the first aqueous solution and sodium ions in the swellable fine particles in the pores of the consolidated rock in the near wellbore area of the formation, wherein said cationic exchange reduces any existing swelling of the swellable fine particles caused by contact with an aqueous liquid having an ionic makeup distinct from the connate water;

(d) continuously injecting a slug of a second aqueous solution, comprising soft water having about 100 to about 100,000 pounds/porosity foot of potassium hydroxide, via the wellbore out through the pores of the consolidated rock in the near wellbore area at a rate sufficient to prevent the connate water from backflowing through the near wellbore area of the formation;

(e) displacing the second aqueous solution with a displacing fluid out beyond the near wellbore area an average radial distance greater than at least about 25 feet from the wellbore to contact the swellable fine particles in the pores of the consolidated rock in the near wellbore area and in the pores of the formation beyond the near wellbore area and to contact the migratable fine particles in the pores of the formation beyond the near wellbore area;

(f) shutting in the well for a time sufficient to render the swellable fine particles in the pores of the formation in and beyond the near wellbore area and the migratable fine particles in the pores of the formation beyond the near wellbore area insensitive to subsequent formation damage caused by contact with the aqueous liquid having an ionic makeup distinct from the connate water; and (g) returning the well to normal operation.

13. The process of claim 12 wherein the unreactive gas is nitrogen and about 5000 SCF of nitrogen is injected into the wellbore.

14. The process of claim 12 wherein the well is shut in for about 4 to about 64 hrs in step (f).

* * * * *

UNITED STATES PATENT AND TRADEMARK OFFICE
CERTIFICATE OF CORRECTION

PATENT NO. : 4,844,169
DATED : July 4, 1989
INVENTOR(S) : Benjamin F. Sloat

It is certified that error appears in the above-identified patent and that said Letters Patent is hereby corrected as shown below: On the title page:

Abstract, line 7: Delete "Thereafer" and insert --Thereafter--.
Col. 7, line 13: Delete "rear" and insert --near--.

Signed and Sealed this

Twenty-fourth Day of April, 1990

Attest:

HARRY F. MANBECK, JR.

*Attesting Officer*  *Commissioner of Patents and Trademarks*